United States Patent
Ossipov et al.

(10) Patent No.: US 9,426,262 B2
(45) Date of Patent: Aug. 23, 2016

(54) TRANSPORT CONTROL PROTOCOL SEQUENCE NUMBER RECOVERY IN STATEFUL DEVICES

(71) Applicant: Cisco Technology, Inc., San Jose, CA (US)

(72) Inventors: Andrew E. Ossipov, Richardson, TX (US); Kent Leung, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 123 days.

(21) Appl. No.: 14/246,365

(22) Filed: Apr. 7, 2014

(65) Prior Publication Data
US 2015/0288509 A1 Oct. 8, 2015

(51) Int. Cl.
*H04L 1/16* (2006.01)
*H04L 29/14* (2006.01)
*H04L 29/06* (2006.01)

(52) U.S. Cl.
CPC ............... *H04L 69/40* (2013.01); *H04L 63/02* (2013.01); *H04L 69/163* (2013.01)

(58) Field of Classification Search
CPC ...................................................... H04L 45/28
USPC ........................................................ 370/216
See application file for complete search history.

(56) References Cited

U.S. PATENT DOCUMENTS

| 7,203,961 | B1 | 4/2007 | Dalal et al. |
| 8,001,279 | B2 | 8/2011 | Berthaud et al. |
| 2003/0120816 | A1* | 6/2003 | Berthaud ................ H04L 63/20 709/248 |
| 2013/0066969 | A1* | 3/2013 | Cohen ................ H04L 65/4084 709/204 |
| 2014/0207737 | A1* | 7/2014 | Joo .................... G06F 17/30365 707/634 |

FOREIGN PATENT DOCUMENTS

EP 1 792 468 B1 1/2008

OTHER PUBLICATIONS

Ramaiah, et al., "Improving TCP's Robustness to Blind In-Window Attacks," Internet Engineering Task Force (IETF), Request for Comments: 5961, Standards Track, Aug. 2010, pp. 1-19.
Postel, "Transmission Control Protocol," DARPA Internet Program, Protocol Specification, RFC: 793, Sep. 1981, 92 pages.

* cited by examiner

*Primary Examiner* — Shripal Khajuria
(74) *Attorney, Agent, or Firm* — Edell, Shapiro & Finnan, LLC

(57) ABSTRACT

Techniques are presented herein for optimizing network traffic exchanged between devices in a network. A firewall device in a network detects a firewall failure event. In response to detecting the firewall failure event, the firewall device changes from a standby state to an active state in managing a network connection between a source device and a destination device in the network. The firewall device generates a synchronization message and sends the synchronization message to the destination device. The firewall device receives from the destination device a response message that includes synchronization information.

21 Claims, 5 Drawing Sheets

TRANSPORT CONTROL PROTOCOL SEQUENCE NUMBER RECOVERY IN STATEFUL DEVICES

TECHNICAL FIELD

The present disclosure relates to optimizing network traffic exchanged between devices in a network environment.

BACKGROUND

In network environments, a client device and a server may be configured to exchange communications with each other. These communications may traverse a network path that includes one or more firewall devices. Firewall devices typically analyze communications (e.g., packets) to determine whether or not the communications should be forwarded to a destination device. For example, a firewall device may reside in a network path between the client device and the server, and upon receiving a packet destined for the client device, the firewall device may analyze information in the packet to determine whether or not the packet is authorized to be sent to the client device. If the packet is an unauthorized packet (e.g., if the packet is unknown or harmful), the firewall device will discard the packet. If the packet is authorized, the firewall device will forward the packet to the client device.

DESCRIPTION OF EXAMPLE EMBODIMENTS

Overview

Figure 1:
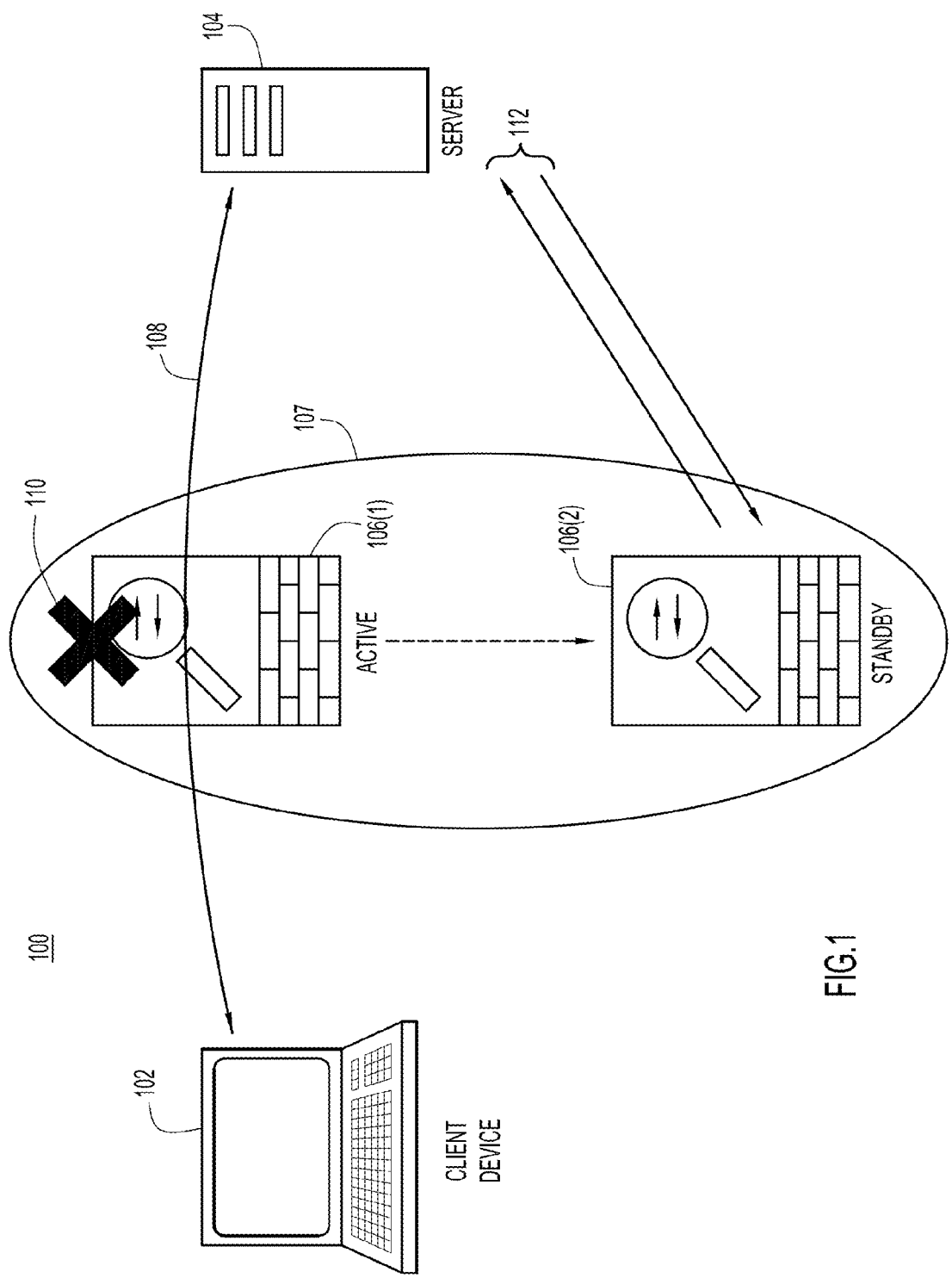
FIG. 1 shows an example network topology that includes a client device, a server and a plurality of firewall devices, according to an example embodiment.

Techniques are presented herein for optimizing network traffic exchanged between devices in a network. A firewall device in a network detects a firewall failure event. In response to detecting the firewall failure event, the firewall device changes from a standby state to an active state in managing a network connection between a source device and a destination device in the network. The firewall device generates a synchronization message and sends the synchronization message to the destination device. The firewall device receives from the destination device a response message comprising synchronization information.

Example Embodiments

The techniques presented herein involve optimizing network traffic exchanged between devices in a network. An example network system/topology (hereinafter "network") is shown at reference numeral 100 in FIG. 1. The network 100 has a client device 102 and a server 104. The network 100 also has a plurality of firewall devices ("firewalls"), shown at reference numeral 106(1) and 106(2). The firewalls are arranged in a cluster of firewalls, shown at reference numeral 107. It should be appreciated that the cluster 107 may contain additional firewalls, and also the network 100 may comprise any number of devices, including any number of client devices and servers.

In FIG. 1, the client device 102 is configured to exchange communications (e.g., packets) with the server 104 via a network connection 108. The network connection 108 may be, e.g., a Transport Control Protocol (TCP) network connection or any network connection that enables the client device 102 and the server 104 to exchange packets with each other. The network connection 108 represents, for example, a data path between the client device 102 and the server 104. The network connection 108 includes one or more of the firewalls in the firewall cluster 107. For example, as shown in FIG. 1, the network connection 108 includes firewall 106(1), but as will become apparent hereinafter, the network connection 108 may include firewall 106(2) instead of firewall 106(1) upon a failure event of the firewall 106(1). It should be appreciated that the term "network connection" may also be referred to as a "network path."

The client device 102 and the server 104 are network devices configured to send and receive packets. For example, the client device 102 may be a computer, laptop, mobile device, tablet, etc., and the server 104 may be a network device that is configured to provide network services to the client device 102. The firewalls 106(1) and 106(2), for example, may be network devices (or processes) that are configured to monitor and evaluate network communications (packets) to determine whether or not the packets should be forwarded to their intended destination in the network 100. For example, in FIG. 1, when firewall 106(1) is in the network path 108 between the client device 102 and the server 104, firewall 106(1) may monitor and evaluate packets destined for the client device 102 (e.g., received from the server 104 or another network entity). The firewall 106(1) will determine whether or not the packets are authorized. If the packets are authorized, firewall 106(1) will forward the packets to the client device 102. If the packets are not authorized, firewall 106(1) will discard the packets. For example, an outside party that is not part of the network connection 108 between the client device 102 and the server 104 may attempt to spoof packets or otherwise send unauthorized or harmful packets to either the client device 102 or the server 104. A firewall residing in the network path between client device 102 and the server 104 will provide protection to the client device 102 and the server 104 by preventing unauthorized packets from being forwarded along the network connection 108.

As shown in FIG. 1, firewalls 106(1) and 106(2) may be in either an "active" state or a "standby" state. In one example, the firewalls 106(1) and 106(2) may be specific to the connection 108. That is, firewall 106(2) may be in a standby state with respect to connection 108, but may be in an active state with respect to another connection or set of connections. The firewalls 106(1) and 106(2) are said to be "stateful" network device since they maintain connection state information (e.g., TCP information) and utilize the connection state information, e.g., to reject unauthorized packets. Since firewall 106(1) and firewall 106(2) are part of the same firewall cluster 107, in one example, when firewall 106(1) is in an active state, firewall 106(2) is in a standby state. When firewall 106(1) is in the active state, it maintains synchronization information to evaluate packets sent along the network connection 108 to determine whether or not the packets are authorized, and accordingly, to provide protection services to the client device 102 and the server 104. Firewall 106(1), however, may experience a failure event, shown at reference numeral 110, and as a result, firewall 106(1) may not be able to perform protection services for the client device 102 and the server 104 for packets sent along the network connection 108. In this example, firewall 106(2) may change from a standby state to an active state, in response to the failure event 110. Thus, as depicted at reference numeral 111, firewall 106(2) takes over protective services for the client device 102 and the server 104. When the firewall 106(2) changes to the active state, firewall 106(2) will provide protection services to the client device 102 and the server 104 for packets sent along the network connection 108. Thus, upon changing from the standby state to the active state, firewall 106(2) resides in the network path between the client device 102 and the server 104 as a part of the network connection 108. In other words, when the firewall 106(1) experiences the failure event 110 the network connection 108 will still be present between the client device 102 and the server 104, and the network connection 108 will include the firewall 106(2). As represented at reference numeral 112 in FIG. 1, the firewall 106(2) may exchange communications with the server 104 to obtain synchronization information. These techniques are described in more detail hereinafter.

As stated above, the firewalls 106(1) and 106(2) may be in an active state or a standby state. In one example, a firewall in an active state ("active firewall") is configured to maintain synchronization information. The synchronization information is used by the active firewall to check whether or not packets sent along the network connection 108 between client device 102 and the server 104 are authorized. In FIG. 1, firewall 106(1) operates as the active firewall before the failure event 110, and firewall 106(2) operates as the active firewall after the failure event 110. In one example, the active firewall maintains synchronization information that includes expected sequence numbers and expected acknowledgement numbers for packets (e.g., for TCP packets). The expected sequence numbers and expected acknowledgment numbers which indicate to the active firewall what the next-expected sequence number and acknowledgement number should be for packets received by the active firewall along the network connection 108. With this synchronization information, the active firewall can evaluate a transit TCP packet (e.g., sent by the client device 102, the server 104 or another third party device that is attempting to spoof packets in the network connection 108) to determine the sequence number and acknowledgement number of the transit TCP packet. If the sequence number and the acknowledgement number of the TCP packet conform with the next-expected values indicated in the synchronization information, the active firewall will forward the packet in the network 100. If the sequence number and the acknowledgement number of the TCP packet do not conform with the next-expected values, the active firewall will discard the packet. Additionally, in another example, the acknowledgment number of the TCP packet can be used to authenticate the next sequence number of a packet received from the server 104, and likewise, the sequence number of the TCP packet can be used to authenticate the next acknowledgment number of a packet received from the server 104. In other words, the sequence number and the acknowledgment number can be used to predict the next-expected values.

Thus, stateful firewalls provide protection services along a network connection by typically tracking sequence numbers and acknowledgement numbers of transit packets to allow conforming packets to traverse a firewall in the network 100 and to prevent non-conforming packets from traversing the firewall in the network 100. As stated above, an active firewall can experience a failure event, and as a result, another firewall previously in a standby state will be activated (e.g., will change to an active state) to provide protection services along the network connection. In the network 100 in FIG. 1, firewall 106(1) is the initial active firewall, and upon firewall 106(1) experiencing the failure event 110, firewall 106(2) activates to become the new active firewall. When firewall 106(2) becomes the new active firewall, it needs to obtain the synchronization information (e.g., the expected sequence numbers and acknowledgment numbers) to provide the protection services for client device 102 and the server 104 along the network connection 108.

In traditional network environments, to ensure that firewall 106(2) has the necessary synchronization information, firewall 106(1) sends connection updates (including the synchronization information) for the network connection 108 to firewall 106(2) while firewall 106(1) is the active firewall. In other words, while firewall 106(1) is active (e.g., before the failure event 110), firewall 106(1) will send the expected sequence numbers and acknowledgment numbers to firewall 106(2) for packets on the network connection 108 between the client device 102 and the server 104. However, as network environments scale and as more firewall clusters are included in a network environment, it becomes bandwidth-intensive and resource-consuming for active firewalls to send the synchronization information to every standby firewall. Existing solutions for alleviating these problems involve periodically synchronizing active firewalls and standby firewalls with the connection updates (including the synchronization information). However, these existing solutions have several drawbacks. First, as synchronization information is sent between the firewalls, one or more of the firewalls may be placed in a "relaxed" state, and when in the relaxed state, the firewall may not prevent unauthorized packets from being sent in a network. Additionally, for certain network connections that are infrequently used, packets may not be exchanged while the synchronization information is sent to the firewalls, and thus, the standby firewalls may not receive the most up-to-date information. It should be appreciated that for infrequently used connections, new packets may not arrive during a window of time in which one or more of the firewalls are in the relaxed state. Thus, the stateful connection information may not be updated with the correct sequence and acknowledgment numbers that are expected. In general, the relaxed state of the firewalls is a security machine state of a newly active firewall, where the firewall will implicitly trust and learn any sequence and acknowledgment numbers in existing connections from transit packets. The relaxed firewall will simply verify the basic connection parameters (such as address information and TCP and/or User Datagram Protocol (UDP) port numbers).

The techniques described herein alleviate these problems by enabling firewalls to obtain synchronization information efficiently. In particular, the techniques described herein enable a newly active firewall (e.g., firewall 106(2) after the failure event 110) to discover expected sequence and acknowledgement numbers for an existing network connection (e.g., network connection 108), even if the endpoints are not actively exchanging communications with each other during the switchover event.

Figure 2:
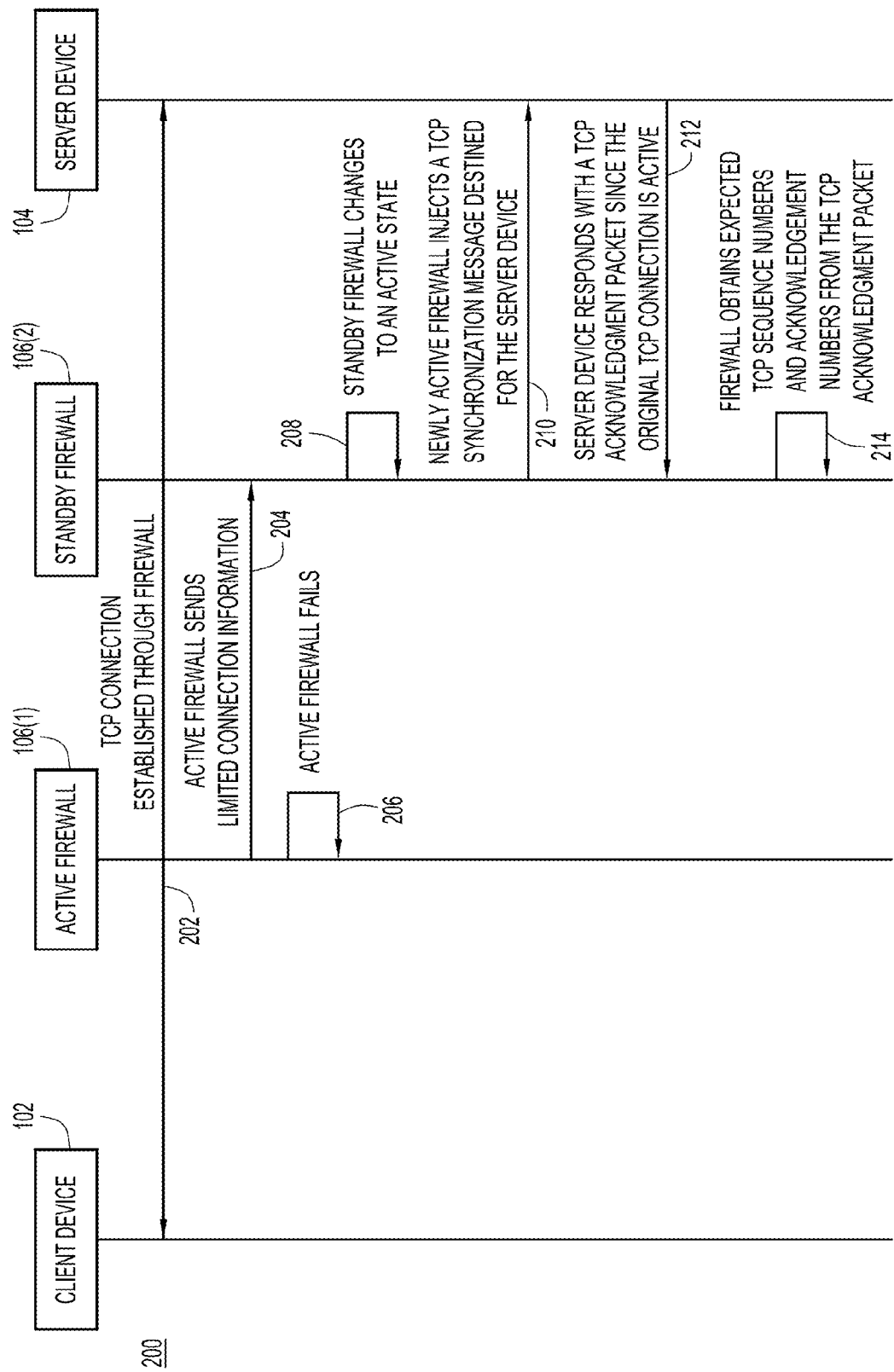
FIG. 2 shows an example ladder diagram depicting communications exchanged between the client device, the server and one of the firewall devices, according to an example embodiment.

Reference is now made to FIG. 2, which shows an example ladder diagram 200 depicting exchanges between elements in the network 100. The exchanges depicted in FIG. 2 enable firewall 106(2) to perform synchronization operations to obtain the connection synchronization information efficiently. FIG. 2 is described with continued reference to FIG.

1. At reference numeral 202, a TCP connection is established between the client device 102 and the server 104. The TCP connection is shown in FIG. 1 as the network connection 108. It should be appreciated that the network connection 108 may be any network connection enabling packets to be exchanged between the client device 102 and the server 104 along a network path. For simplicity, the network connection 108 is described herein as a TCP network connection, and the packets exchanged between the client device 102 and the server 104 are described herein as TCP packets. Likewise, the synchronization information described herein, in one example, pertains to synchronization information that enables the firewalls 106(1) and 106(2) to evaluate and verify TCP packets.

The TCP connection is established between the client device 102 and the server 104 through the original active firewall (i.e., firewall 106(1)). At 204, the firewall 106(1) (currently active), sends limited connection information to the standby firewall (i.e., firewall 106(2)) in the firewall cluster 107. For example, firewall 106(1) sends to firewall 106(2) keepalive messages to maintain a connection between firewall 106(1) and firewall 106(2). The keepalive messages, in general, indicate to the standby firewall that the connection 108 is still active. The keepalive messages, however, do not contain any state information. Additionally, firewall 106(1) sends to firewall 106(2) information pertaining to a source device and destination device of the network connection 108. For example, firewall 106(1) sends to firewall 106(2) the source address (e.g., Internet Protocol (IP) address) of the client device 102, the destination address of the server 104, source port information (e.g., TCP port information) associated with the client device 102 and destination port information associated with the server 104. However, the connection information sent by firewall 106(1) at reference numeral 204, does not include synchronization information. That is, firewall 106(1) sends limited connection information to firewall 106(2), but does not send the synchronization information to firewall 106(2) (e.g., comprising the expected sequence numbers and acknowledgment numbers for packets that are received on the network connection 108). Sending the limited connection information is less bandwidth-intensive and resource-consuming than sending the synchronization information.

At reference numeral 206, firewall 106(1) experiences a failure event 110. For example, the failure event 110 may include a connectivity failure of the firewall 106(1) in the network 100 and/or a hardware/software failure of firewall 106(1). Though not shown in FIG. 2, when firewall 106(1) experiences a failure event 110, firewall 106(2) detects that firewall 106(1) has experienced a failure event. For example, firewall 106(2) may receive a message indicating that firewall 106(1) has experienced a failure event or firewall 106(2) may detect an absence of the firewall 106(1) based on the absence of receiving periodic keepalive messages from firewall 106(1). In response to detecting the failure event, firewall 106(2) changes from a standby state to an active state, as shown at 208. Thus, upon changing its state from a standby state to an active state, firewall 106(2) is now the new active firewall, and accordingly, firewall 106(2) is responsible for protecting packets exchanged between the client device 102 and the server 104 along the network connection 108. It should be appreciated that although the original active firewall 106(1) experienced a failure event 110, the network connection 108 between the client device 102 and the server 104 is still operational. After the failure event 110, the network connection 108 includes the newly active firewall 106(2), and firewall 106(2) thus manages the network connection 108 after the failure event 110.

After changing to the active state from the standby state, firewall 106(2) generates a synchronization message. The synchronization message generated by firewall 106(2) is a message that is intended to trigger a response message to be sent to firewall 106(2) by a network device that is the destination of the synchronization message. The response by the destination of the synchronization message includes the synchronization information required by the firewall 106(2) to perform the protection services for the client device 102 and the server 104 for packets received along the network connection 108. In one example, the firewall 106(2) generates a TCP synchronization message ("TCP SYN" message) using, e.g., the limited connection information associated with the connection 108 previously provided by firewall 106(1) (in operation 204) before the failure event 110. At reference numeral 210 in FIG. 1, firewall 106(2) sends the TCP SYN message to the server 104. Upon receiving the TCP SYN packet, the server 104 (e.g., the destination of the TCP SYN message) will respond by sending synchronization information to the firewall 106(2). In one example, the TCP SYN message spoofs the source and destination addresses and TCP ports of the original connection 108. As a result, the server 104 assumes that the packet was sent by the client device 102. As shown at reference numeral 212 in FIG. 2, the server 104 (also referred to a "responder" to the TCP SYN message) will send a TCP acknowledgment message ("TCP ACK" message) to firewall 106(2) in accordance with the Internet Engineering Task Force (IETF) Request for Comments (RFC) 793. For example, the server 104 will respond with the TCP ACK message since it still has the current network connection 108 alive (even though the failure event 110 removed firewall 106(1) from the network connection 108). Firewall 106(2), thus, may also be referred to as the "initiator" of the TCP SYN message. It should be appreciated that firewall 106(2) may send the TCP SYN message to the client device 102 instead of the server 104, and accordingly, the client device 102 may operate as the responder to the TCP SYN message. For simplicity, it is assumed herein that the server 104 is the responder to the TCP SYN message initiated by firewall 106(2).

The TCP ACK message contains, e.g., next-expected sequence numbers and acknowledgment numbers. Upon receiving the TCP ACK message from the server 104, firewall 106(2) will analyze the TCP ACK message, and as shown at reference numeral 214 in FIG. 2, firewall 106(2) will obtain the synchronization information contained in the TCP ACK message, including, e.g., the next-expected sequence numbers and acknowledgement numbers. Thus, the synchronization information in the TCP ACK message contains sufficient information for firewall 106(2) to recreate the stateful session between client device 102 and server 104. Firewall 106(2) will store this synchronization information in a database, and upon receiving subsequent data packets along the network connection (between the network device 102 and the server 104) firewall 106(2) will use the synchronization information to determine whether or not the packets are authorized or unauthorized packets. Thus, firewall 106(2) is able to prevent a malicious third-party TCP spoofing attack by storing the synchronization information received from the server 104. It should be appreciated that if firewall 106(2) does not receive the TCP ACK message from server 104 after a predetermined period of time, firewall 106(2) may terminate the network connection 108 between the client device 102 and the server 104. Additionally, in some embodiments, firewall 106(2) may send the TCP SYN message only when a packet is received for a particular network connection. Thus, firewall 106(2) is able to stagger the synchronization request messages such that TCP SYN messages are sent only for network connections with active communications (e.g., active packet exchanges).

Figure 3:
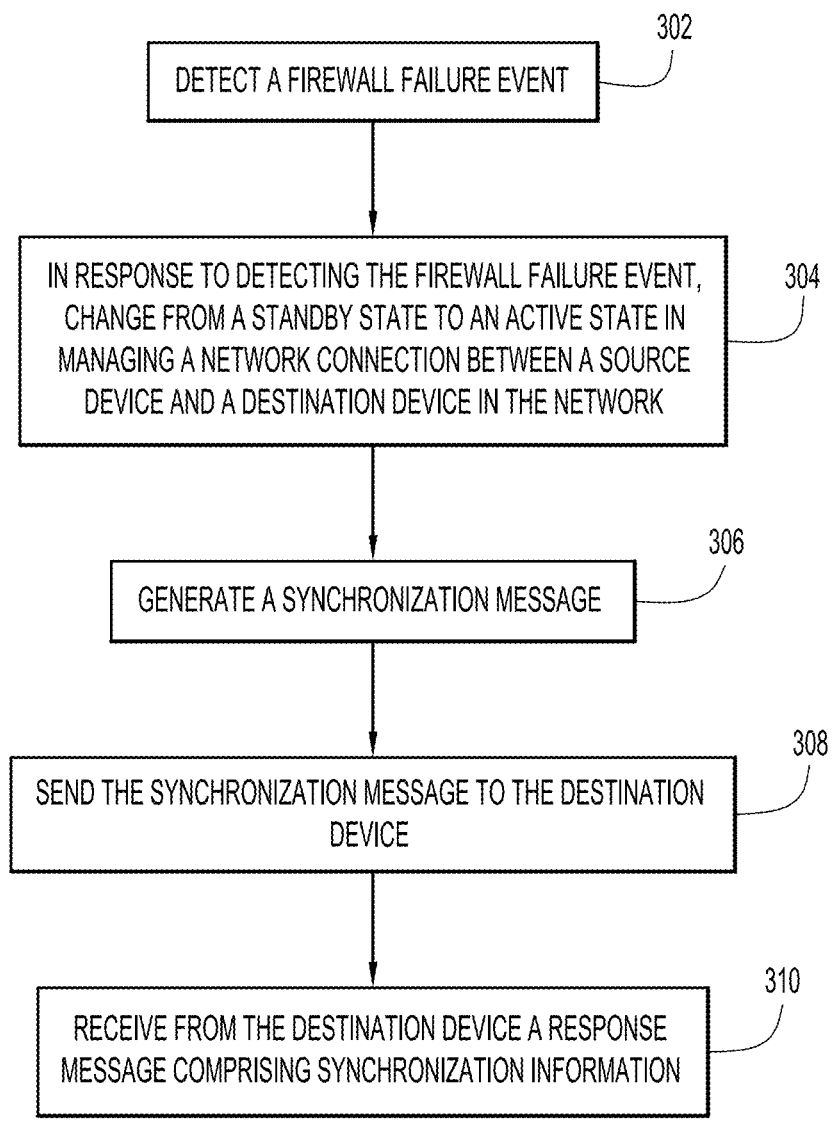
FIG. 3 shows an example flow chart depicting operations of the firewall device performing synchronization techniques, according to an example embodiment.

Reference is now made to FIG. 3. FIG. 3 shows an example flow chart 300 depicting operations of firewall 106(2) performing synchronization operations to obtain the synchronization information. At reference numeral 302, firewall 106(2) detects the firewall failure event (e.g., the failure event 110 of firewall 106(1)). In response to detecting the firewall failure event, at 304, firewall 106(2) changes from a standby state to an active state for managing a network connection between a source device and a destination device in the network. For example, firewall 106(2) changes to the active state to manage the network connection 108 between the client device 102 and the server 104 to provide protection services to the network device 102 and the server 104. At 306, firewall 106(2) generates a synchronization message (e.g., a TCP SYN message), and at 308, firewall 106(2) sends the synchronization message to the destination device. At 310, firewall 106(2) receives from the destination device a response message (e.g., a TCP ACK message) comprising synchronization information. As stated above, the synchronization information includes, for example, next-expected sequence numbers and acknowledgment numbers.

Figure 4:
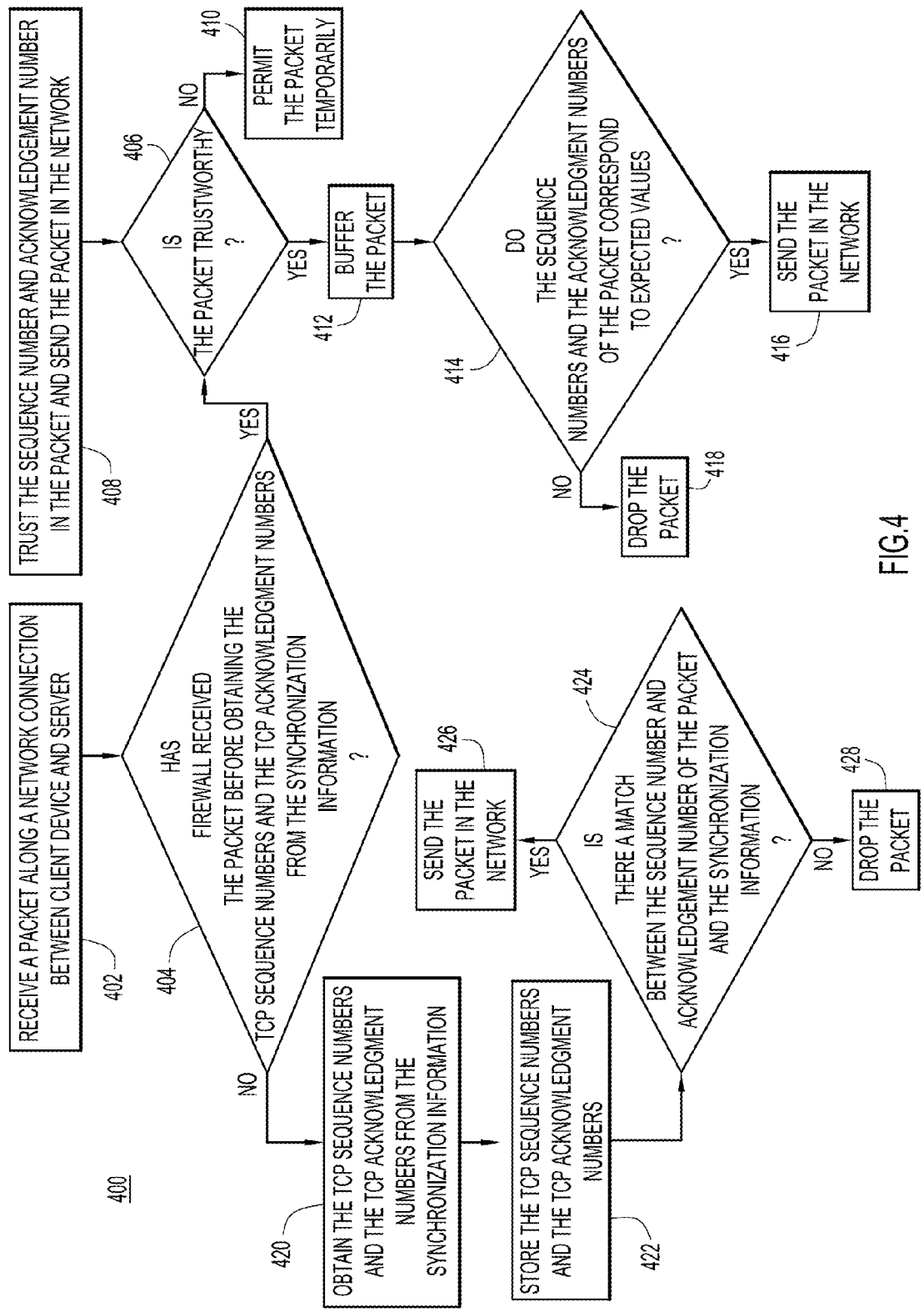
FIG. 4 shows an example flow chart depicting operations of the firewall device managing packet flows received during the synchronization, according to an example embodiment.

Reference is now made to FIG. 4. FIG. 4 shows an example flow chart 400 depicting operations performed by firewall 106(2) to manage packet flows received during the synchronization operations. For example, after the failure event 110, firewall 106(2) changes its state from a standby state to an active state, as described above. However, firewall 106(2) still needs to obtain the synchronization information, as described in FIG. 3 before it can evaluate packets received in the network connection 108 between the client device 102 and the server 104. As firewall 106(2) sends the synchronization message (TCP SYN) to the server 104, but before firewall 106(2) receives the response message (TCP ACK) from the server 104, the client device 102 may attempt to exchange packets with the server 104 along the network connection 108. In other words, packets may be exchanged between the client device 102 and the server 104 before firewall 106(2) obtains the synchronization information, and thus, firewall 106(2) must be provisioned for handling these packets as it waits to obtain the synchronization information. It should be appreciated that in FIG. 4, the term "packets" refers to data packets (e.g., TCP packet) that are exchanged between the client device 102 and the server 104 along the network connection 108 and the term "synchronization message" refers to the message originating by firewall 106(2) and destined for the server 104 to provoke the server to send a "response message" containing the synchronization information.

In FIG. 4, at 402, firewall 106(2) receives a packet along a network connection between the client device 102 and the server 104. At 404, firewall 106(2) determines whether or not it has received the packet before obtaining synchronization information, e.g., before receiving expected TCP sequence numbers and acknowledgement numbers from the server 104. For example, if firewall 106(2) does not have any synchronization information associated with the network connection 108, firewall 106(2) can determine that it received the packet before obtaining the synchronization information. If firewall 106(2) did receive the packet before obtaining the synchronization information (i.e., if the answer to decision 404 is "yes"), at 406, firewall 106(2) makes a determination as to whether or not the packet is trustworthy. For example, firewall 106(2) may determine that certain packets (e.g., high-volume packets) are high-priority, and thus, firewall 106(2) may inherently trust these packets. In another example, firewall 106(2) may assume that all packets are untrustworthy. In another example, firewall 106(2) may buffer the packets from a first network entity (e.g., client device 102) until a second network entity (e.g., the server 104) sends a packet destined for the first network entity. The firewall 106(2) can evaluate the packet received by the server 104 destined for the client device 102 and compare the sequence and/or acknowledgment numbers of the packet received from the client device 102 (destined for the server 104) and of the packet received from the server 104 (destined for the client device 102). Since spoofing attacks are typically initiated from one interface, if the sequence and/or acknowledgment numbers of the packets match, the firewall 106(2) may trust these packets.

If firewall 106(2) determines that the packet is trustworthy (i.e., if the answer to operation 406 is "yes"), at operation 408, firewall 106(2) trusts the sequence number and acknowledgment number of the packet and forwards (sends) the packet in the network 100 along the network connection 108. If firewall 106(2) determines that the packet is untrustworthy, firewall 106(2) may execute one of two options. In the first option, at 410, firewall 106(2) temporarily permits the packet and allows it to be forwarded in the network 100 along the network connection 108. In the second option, at 412, firewall 106(2) buffers the packet (e.g., until the synchronization information is obtained or until a predetermined about of time has expired), and at operation 414 the firewall 106(2) determines whether or not the sequence number and acknowledgement number of the packet correspond to expected values. As stated above, firewall 106(2) does not yet have the synchronization information, and thus, firewall 106(2) cannot compare the sequence number and acknowledgment number of the packet to the next-expected sequence number and acknowledgment number in the synchronization information. However, firewall 106(2) can still examine the sequence number and the acknowledgement number of the packet to determine whether or not these numbers have significant deviations when compared to other packets received along the network connection 108 (e.g., received from the client device 102 or the server 104 during a low time-out phase). If there are no significant deviations (i.e., if the answer decision 414 is "yes"), at 416, firewall 106(2) sends the packet in the network 100. If there are significant deviations (i.e., if the answer to decision 416 is "no"), at 418, firewall 106(2) drops (discards) the packet.

If, however, the packet was received after firewall 106(2) receives the synchronization information (i.e., if the answer to decision 404 is "no), firewall 106(2), at 420, obtains the next-expected sequence numbers and the acknowledgment numbers from the synchronization information (e.g., received by firewall 106(2) from the server 104 as a part of the TCP ACK message). At 422, firewall 106(2) stores the next-expected sequence numbers and the acknowledgement numbers obtained from the synchronization information. At operation 424, firewall 106(2) determines whether the sequence number and acknowledgment number of the packet matches the next-expected sequence number and acknowledgment number obtained by firewall 106(2) from the synchronization information (e.g., firewall 106(2) verifies the packet). If there is a match, firewall 106(2) at 426 sends the packet in the network 100 along the network connection 108. If there is not a match (i.e., if either the packet sequence number or the packet acknowledgement number does not match the expected values), firewall 106(2) drops the packet at 428. Additionally, if there is not a match, or if there are a significant number of subsequent packets that do not match (i.e., that are unauthorized) firewall 106(2) may terminate the network connection 108 between the client device 102 and the server 104, since the network connection 108 might be susceptible to third-party spoofing attacks.

Figure 5:
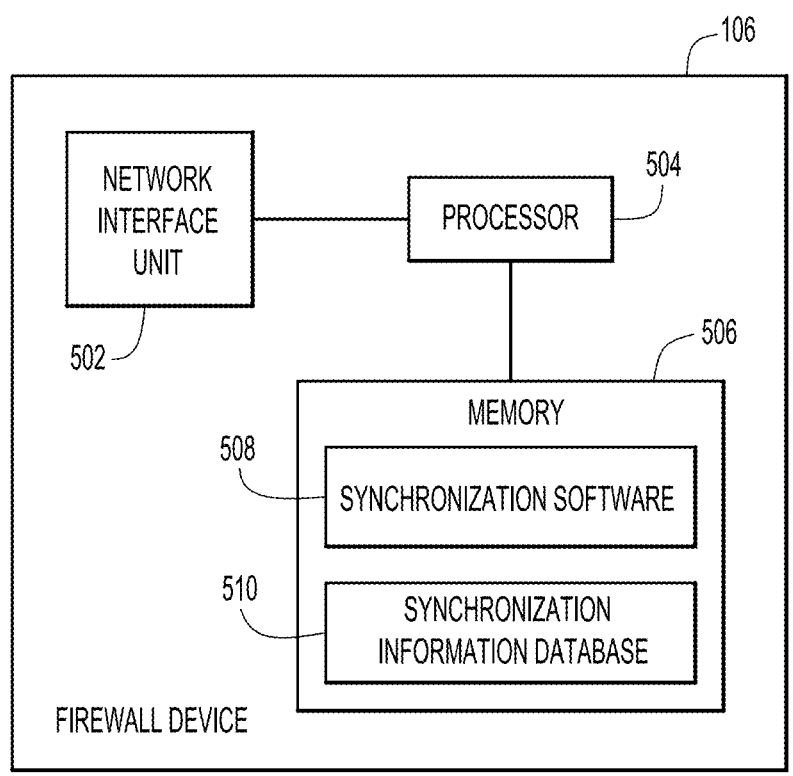
FIG. 5 shows an example block diagram of one of the firewall devices configured to perform the synchronization operations, according to an example embodiment.

Reference is now made to FIG. 5. FIG. 5 shows an example block diagram 106 of a firewall configured to perform synchronization operations to obtain synchronization information. It should be appreciated that FIG. 5 refers to the firewall 106 generally, and firewall 106 in FIG. 5 may be either firewall 106(1) or firewall 106(2). Firewall 106 in FIG. 5 comprises a network interface unit 502, a processor 504 and memory 506. The network interface unit 502 is configured to send and receive communications (e.g., packets, synchronization messages, response to synchronizations messages, etc.) from devices in the network 100. To this end, the network interface unit 502 includes ports (not shown) to send messages to, and receive messages from, the network. The processor 504 is, for example, a microprocessor or microcontroller that is configured to execute program logic instructions (i.e., software) for carrying out various operations and tasks of the firewall 1 106, as described above. For example, the processor 504 is configured to execute synchronization software 508 to enable the firewall 106 to obtain the synchronization information efficiently, as described herein. The functions of the processor 504 may be implemented by logic encoded in one or more tangible computer readable storage media or devices (e.g., storage devices, compact discs, digital video discs, flash memory drives, etc. and embedded logic such as an application specific integrated circuit, digital signal processor instructions, software that is executed by a processor, etc.).

The memory 506 may comprise read only memory (ROM), random access memory (RAM), magnetic disk storage media devices, optical storage media devices, flash memory devices, electrical, optical, or other physical/tangible (non-transitory) memory storage devices. The memory 506 stores software instructions for the synchronization software 508. The memory 506 also stores a synchronization information database 510, which is configured to store the synchronization information obtained by the firewall 106. Thus, in general, the memory 506 may comprise one or more computer readable storage media (e.g., a memory storage device) encoded with software comprising computer executable instructions and when the software is executed (e.g., by the processor 504) it is operable to perform the operations described for the synchronization software 508.

The synchronization software 508 may take any of a variety of forms, so as to be encoded in one or more tangible computer readable memory media or storage device for execution, such as fixed logic or programmable logic (e.g., software/computer instructions executed by a processor), and the processor 504 may be an ASIC that comprises fixed digital logic, or a combination thereof.

For example, the processor 504 may be embodied by digital logic gates in a fixed or programmable digital logic integrated circuit, which digital logic gates are configured to perform the synchronization software 508. In general, the synchronization software 508 may be embodied in one or more computer readable storage media encoded with software comprising computer executable instructions and when the software is executed operable to perform the operations described hereinafter.

It should be appreciated that the techniques described above in connection with all embodiments may be performed by one or more computer readable storage media that is encoded with software comprising computer executable instructions to perform the methods and steps described herein. For example, the operations performed by the network device 102, the server 104 and the firewall 106 may be performed by one or more computer or machine readable storage media (non-transitory) or device executed by a processor and comprising software, hardware or a combination of software and hardware to perform the techniques described herein.

In summary, a method is provided comprising: at a firewall device in a network, detecting a firewall failure event; in response to detecting the firewall failure event, changing from a standby state to an active state of the firewall device in managing a network connection between a source device and a destination device in the network; generating a synchronization message; sending the synchronization message to the destination device; and receiving from the destination device a response message comprising synchronization information.

In addition, an apparatus is provided, comprising: a network interface unit configured to enable network communications; and a processor coupled to the network interface unit, and configured to: detect a firewall failure event; change from a standby state to an active state in response to detecting the firewall failure event to manage a network connection between a source device and a destination device in a network; generate a synchronization message; send the synchronization message to the destination device; and receive from the destination device a response message comprising synchronization information.

Furthermore one or more computer-readable storage media is provided that is encoded with software comprising computer executable instructions and when the software is executed operable to: detect a firewall failure event; in response to detecting the firewall failure event, change from a standby state to an active state of the firewall device in managing a network connection between a source device and a destination device in the network; generate a synchronization message; send the synchronization message to the destination device; and receive from the destination device a response message comprising synchronization information.

The above description is intended by way of example only. Various modifications and structural changes may be made therein without departing from the scope of the concepts described herein and within the scope and range of equivalents of the claims.

What is claimed is:

1. A method comprising:
   at a first firewall device in a network, detecting a firewall failure event of second firewall device;
   in response to detecting the firewall failure event of the second firewall device, changing a state of the first firewall device from a standby state to an active state in managing a network connection between a source device and a destination device in the network;
   generating at the first firewall device a synchronization message;
   sending the synchronization message from the first firewall device to the destination device; and
   receiving at the first firewall device a response message from the destination device that includes synchronization information.

2. The method of claim 1, wherein the synchronization message is a Transport Control Protocol (TCP) synchronization message and wherein the response message is a TCP acknowledgement message.

3. The method of claim 2, wherein the synchronization information includes next expected TCP sequence numbers and TCP acknowledgement numbers for packets exchanged in the network connection.

4. The method of claim 1, further comprising:
   obtaining the synchronization information from the response message; and storing the synchronization information at the first firewall device.

5. The method of claim 4, further comprising:
before obtaining the synchronization information, receiving a packet via the network connection;
determining a packet sequence number and a packet acknowledgement number associated with the packet;
buffering the packet until obtaining the synchronization information; and
after obtaining the synchronization information, verifying whether or not the packet sequence number and the packet acknowledgment number of the packet correspond to expected packet sequence number values and packet acknowledgement number values indicated in the synchronization information.

6. The method of claim 5, further comprising sending the packet in the network if the verifying indicates that the packet sequence number and the packet acknowledgement number correspond to expected values indicated in the synchronization information.

7. The method of claim 5, further comprising discarding the packet if the verifying indicates that either the packet sequence number or the packet acknowledgement number does not correspond to expected values indicated in the synchronization information.

8. The method of claim 5, further comprising terminating the network connection if the verifying indicates that either the packet sequence number or the packet acknowledgement number does not correspond to expected values indicated in the synchronization information.

9. The method of claim 5, further comprising:
before obtaining the synchronization information, receiving a packet via the network connection;
evaluating the packet to determine a packet type; and
sending the packet in the network if the packet type indicates that the packet is a high-volume packet.

10. The method of claim 1, wherein sending comprises sending to the destination device the synchronization message when the network connection is a high-priority network connection.

11. The method of claim 1, further comprising dropping the network connection if the response message is not received from the destination device within a predetermined period of time.

12. An apparatus comprising:
a network interface unit configured to enable network communications; and
a processor coupled to the network interface unit, and configured to:
detect a firewall failure event of a firewall device other than said apparatus;
change a state of the apparatus from a standby state to an active state in response to detecting the firewall failure event of the firewall device to manage a network connection between a source device and a destination device in a network;
generate a synchronization message;
cause the synchronization message to be sent to the destination device; and
obtain from the network interface unit a response message received from the destination device, the response message including synchronization information.

13. The apparatus of claim 12, wherein the processor is further configured to:
analyze the response message to obtain from the response message the synchronization information; and
store the synchronization information.

14. The apparatus of claim 13, wherein the processor is further configured to:
obtain a packet received by the network interface unit via the network connection before the synchronization information is obtained;
determine a packet sequence number and a packet acknowledgment number associated with the packet;
buffer the packet until obtaining the synchronization information; and
after obtaining the synchronization information, verify whether or not the packet sequence number and the packet acknowledgment number of the packet correspond to expected packet sequence number values and packet acknowledgment number values indicated in the synchronization information.

15. The apparatus of claim 14, wherein the processor is further configured to cause the packet to be sent in the network if the packet sequence number and the packet acknowledgment number correspond to expected values indicated in the synchronization information.

16. The apparatus of claim 15, wherein the processor is further configured to discard the packet if either the packet sequence number or the packet acknowledgment number does not correspond to expected values indicated in the synchronization information.

17. A computer-readable storage media encoded with software comprising computer executable instructions and when the software is executed operable to:
detect at a first firewall device a firewall failure event of a second firewall device;
change a state of the first firewall device from a standby state to an active state in managing a network connection between a source device and a destination device in a network in response to detection of the firewall failure event of the second firewall device;
generate a synchronization message at the first firewall device;
cause the synchronization message to be sent from the first firewall device to the destination device; and
obtain at the first firewall device a response message received from the destination device, the response message including synchronization information.

18. The computer-readable storage media of claim 17, further comprising instructions operable to:
obtain the synchronization information from the response message; and
store the synchronization information.

19. The computer-readable storage media of claim 18, further comprising instructions operable to:
obtain a packet received by the network interface unit via the network connection before the synchronization information is obtained;
determine a packet sequence number and a packet acknowledgement number associated with the packet;
buffer the packet until obtain the synchronization information; and
after obtaining the synchronization information, verify whether or not the packet sequence number and the packet acknowledgment number of the packet correspond to expected packet sequence number values and packet acknowledgement number values indicated in the synchronization information.

20. The computer-readable storage media of claim 19, further comprising instructions operable to cause the packet to be sent in the network if the packet sequence number and the packet acknowledgement number correspond to expected values indicated in the synchronization information.

21. The computer-readable storage media of claim 19, further comprising instructions operable to discard the packet if the packet sequence number or the packet acknowledgement number does not correspond to expected values indicated in the synchronization information.

\* \* \* \* \*